United States Patent
Ha et al.

(10) Patent No.: US 11,102,853 B2
(45) Date of Patent: Aug. 24, 2021

(54) MICROWAVE HEATING SYSTEM HAVING IMPROVED FREQUENCY SCANNING AND HEATING METHODS

(71) Applicant: LG Electronics Inc., Seoul (KR)

(72) Inventors: Jung Hyeong Ha, Seoul (KR); Sung-Hun Sim, Seoul (KR); Hyo Jin An, Seoul (KR); Jongseong Ji, Seoul (KR); Yun Byung Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 16/182,756

(22) Filed: Nov. 7, 2018

(65) Prior Publication Data

US 2019/0313488 A1    Oct. 10, 2019

(30) Foreign Application Priority Data

Apr. 4, 2018    (KR) .................. 10-2018-0039406

(51) Int. Cl.
*H05B 6/68* (2006.01)
*H05B 6/70* (2006.01)
(Continued)

(52) U.S. Cl.
CPC ............. *H05B 6/687* (2013.01); *H05B 6/664* (2013.01); *H05B 6/686* (2013.01); *H05B 6/72* (2013.01); *H05B 2206/044* (2013.01)

(58) Field of Classification Search
CPC .......... H05B 6/664; H05B 6/72; H05B 6/686; H05B 6/687; H05B 2206/044
(Continued)

(56) References Cited

U.S. PATENT DOCUMENTS

2010/0176123 A1* 7/2010 Mihara .................. H05B 6/686
                                                        219/746
2010/0224623 A1    9/2010 Yasui et al.
(Continued)

FOREIGN PATENT DOCUMENTS

EP          2205043           7/2010
WO     WO2011058537          5/2011
(Continued)

OTHER PUBLICATIONS

Extended European Search Report in European Application No. 19162748.8, dated Aug. 14, 2019, 14 pages.

*Primary Examiner* — Quang T Van
(74) *Attorney, Agent, or Firm* — Fish & Richardson P.C.

(57) ABSTRACT

A microwave heating system includes: a power supply; a first semiconductor module configured to receive power from the power supply and to generate a first microwave; a second semiconductor module configured to receive power from the power supply and to generate a second microwave; a heating chamber that is configured to accommodate an object at an inside of the heating chamber and that allows transmission of the first microwave and the second microwave to the inside of the heating chamber; and a control unit. The control unit is configured to control operation of each of the first semiconductor module and the second semiconductor module, and to control at least one of a frequency, a phase, or a magnitude of each of the first microwave and the second microwave to increase a heating uniformity of the object.

20 Claims, 11 Drawing Sheets

(51) Int. Cl.
*H05B 6/72* (2006.01)
*H05B 6/64* (2006.01)
*H05B 6/66* (2006.01)

(58) Field of Classification Search
USPC ....... 219/695, 690, 697, 702, 750, 746, 748,
219/747, 761; 330/295, 107 R; 331/295
See application file for complete search history.

(56) References Cited

U.S. PATENT DOCUMENTS

| | | |
|---|---|---|
| 2011/0204043 A1 | 8/2011 | Ishizaki |
| 2012/0312801 A1 | 12/2012 | Bilchinsky et al. |
| 2013/0062334 A1 | 3/2013 | Bilchinsky et al. |
| 2013/0087545 A1 | 4/2013 | Bilchinsky et al. |
| 2013/0206752 A1 | 8/2013 | Moon et al. |
| 2016/0198530 A1* | 7/2016 | Piel .................. H05B 6/686 219/710 |
| 2017/0027026 A1 | 1/2017 | Bilchinsky et al. |
| 2017/0164431 A1 | 6/2017 | Bilchinsky et al. |

FOREIGN PATENT DOCUMENTS

| | | |
|---|---|---|
| WO | WO2011149275 | 12/2011 |
| WO | WO2012144129 | 7/2014 |

* cited by examiner

MICROWAVE HEATING SYSTEM HAVING IMPROVED FREQUENCY SCANNING AND HEATING METHODS

CROSS-REFERENCE TO RELATED APPLICATIONS

This application claims the priority of Korean Patent Application No. 10-2018-0039406, filed on Apr. 4, 2018, in the Korean Intellectual Property Office, the disclosure of which is hereby incorporated by reference in its entirety.

FIELD

The present disclosure relates to a microwave heating system having improved frequency scanning and heating methods.

BACKGROUND

A microwave oven may include a magnetron for generating a microwave, and a high voltage transformer (HVT) and a high voltage capacitor (HVC) for driving the same. In some examples, a microwave oven may include an inverter instead of the high voltage transformer and high voltage capacitor.

In some examples, the magnetron included in the microwave oven may have a resonator structure. In such examples, when a high voltage output from a secondary stage of the high voltage transformer is applied to the magnetron, the magnetron may cause electron motion due to a shape thereof (i.e., an anode shape thereof).

The high voltage energy may be converted into microwave energy (i.e., electromagnetic wave energy). Further, the resonator structure may allow an output frequency of the electromagnetic wave energy to be determined, and, then, the energy of the determined frequency may be excited from the magnetron.

In some examples, the microwave oven may heat an object such as food by injecting the electromagnetic wave of the determined frequency (i.e., the microwave) into a cavity such as a heating chamber for receiving the object, while the magnetron is connected to a waveguide.

In some cases, the microwave oven may not provide an instantaneous control due to the frequency from the magnetron being fixed, and in accordance with a change of the object. In some cases, this may cause non-uniform heating of the object. In some cases, a turn table system may mitigate non-uniform heating of the object.

In some examples, a microwave oven may include a solid state power module (SSPM), which employs a semiconductor oscillator instead of a magnetron, to implement an instantaneous control according to the object change.

FIG. 1 and FIG. 2 are schematic diagrams illustrating example microwave ovens in related art.

For example, a driving method of a microwave oven including SSPM in related art will be described.

Referring to FIG. 1, a microwave generator 11 of a microwave oven includes an oscillator 12, a power amplifier 13, a power detector 16, a control unit 17, and an antenna 15. The technique for the microwave oven illustrated in FIG. 1 relates to a method of calculating and extracting incident or reflected waves using one antenna 15. In the structure shown in FIG. 1, a uniform heating performance of the load may be lowered, and a turntable may be provided to improve the uniform heating performance. In some cases, it may be difficult to extract the frequency of the microwave as generated from the microwave generator 11. In some cases where two or more antennas are applied, the driving method of the microwave generator 11 illustrated in FIG. 1 may have a difficulty in monitoring an isolation between the antennas. For example, when the inter-antenna isolation is not taken into consideration, a large damage may occur between antennas (or between the microwave generators).

Referring to FIG. 2, a microwave generator 104 of a microwave oven includes two patch antennas 103A and 103B connected to a microwave generator 104, and a control unit 105 for adjusting respective energy levels of the patch antennas 103A and 103B.

The technique for the microwave oven illustrated in FIG. 2 relates to a configuration of the plurality of patch antennas 103A and 103B rather than a heating method of the microwave generator 104 (that is, SSPM). For example, the technique for microwave oven illustrated in FIG. 2 may be suitable for simultaneous heating of multiple objects individually through a corresponding energy level control.

SUMMARY

One purpose of the present disclosure is to provide a microwave heating system having an improved heating algorithm.

Another purpose of the present disclosure is to provide a microwave heating system having an improved frequency scanning algorithm.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

According to one aspect of the subject matter described in this application, a microwave heating system includes: a power supply; a first semiconductor module configured to receive power from the power supply and to generate a first microwave; a second semiconductor module configured to receive power from the power supply and to generate a second microwave; a heating chamber that is configured to accommodate an object at an inside of the heating chamber and that allows transmission of the first microwave and the second microwave to the inside of the heating chamber; and a control unit. The control unit is configured to control operation of each of the first semiconductor module and the second semiconductor module, and to control at least one of a frequency, a phase, or a magnitude of each of the first microwave and the second microwave to increase a heating uniformity of the object.

Implementations according to this aspect may include one or more of the following features. For example, the first semiconductor module and the second semiconductor module may be configured to operate in a concurrent-heating mode. The control unit may be further configured to, in the concurrent-heating mode: based on a predetermined scanning condition and a predetermined scanning mode, perform a first scanning operation with the first semiconductor module and a second scanning operation with the second semiconductor module; based on results from the first scanning operation and the second scanning operation, determine a first optimal frequency for the first semiconductor module and a second optimal frequency for the second semiconductor module; store the first optimal frequency for the first semiconductor module and the second optimal frequency for the second semiconductor module; control the first semiconductor module to generate the first microwave at the first optimal frequency and the second semiconductor module to generate the second microwave at the second optimal frequency; determine a magnitude of a cumulative microwave that is incident to the object from the first semiconductor module and the second semiconductor module; compare the magnitude of the cumulative microwave to a reference microwave magnitude; and based on comparison results, determine whether to stop operating the first semiconductor module and the second semiconductor module.

In some implementations, the control unit is further configured to: based on a determination that the magnitude of the cumulative microwave is greater than or equal to the reference microwave magnitude, stop operating the first semiconductor module and the second semiconductor module; and based on a determination that the magnitude of the cumulative microwave is less than the reference microwave magnitude, perform the first scanning operation with the first semiconductor module and the second scanning operation with the second semiconductor module.

In some implementations, the predetermined scanning mode includes a normal scanning mode. The control unit may be further configured to, in the normal scanning mode: control the first semiconductor module to output the first microwave at an output frequency defined in the predetermined scanning condition; based on output of the first microwave at the output frequency, determine a voltage standing wave ratio (VSWR) and an isolation value for the first semiconductor module; determine whether the determined VSWR satisfies a reference VSWR and whether the determined isolation value satisfies a reference isolation value; based on determination results regarding whether the determined VSWR satisfies the reference VSWR and whether the determined isolation value satisfies the reference isolation value, determine whether to store the output frequency; and after determining whether to store the output frequency, determine whether the output frequency corresponds to a last scan frequency defined in the predetermined scanning condition.

In some implementations, the control unit is further configured to, based on determinations that the determined VSWR satisfies the reference VSWR and that the determined isolation value satisfies the reference isolation value, store the output frequency as the first optimal frequency, and based on storing the output frequency as the first optimal frequency, determine whether the output frequency is the last scan frequency. The control unit may be further configured to, based on determinations that the determined VSWR does not satisfy the reference VSWR and that the determined isolation value does not satisfy the reference isolation value, determine whether the output frequency is the last scan frequency.

In some implementations, the control unit is further configured to: based on a determination that the output frequency is not the last scan frequency, control the first semiconductor module to output the first microwave at a frequency that is greater than the output frequency and that is defined in the predetermined scanning condition; and based on a determination that the output frequency is the last scan frequency, terminate the first scanning operation with the first semiconductor module, and initiate the second scanning operation with the second semiconductor module.

In some implementations, the VSWR for the first semiconductor module includes a ratio parameter between a magnitude of the first microwave that is output from the first semiconductor module and a magnitude of a microwave that is reflected from the heating chamber to the first semiconductor module. The isolation value for the first semiconductor module may include a ratio parameter between a magnitude of the first microwave that is output from the first semiconductor module and a magnitude of a microwave that is reflected from the heating chamber to the second semiconductor module. In some implementations, the control unit is further configured to: control the first semiconductor module to output the first microwave at the output frequency defined in the predetermined scanning condition; and control the phase and the magnitude of the first microwave defined in the predetermined scanning condition.

In some implementations, the predetermined scanning condition includes a scan frequency band including one or more scan frequencies, and one or more condition sets, each of which includes a frequency, a phase, and a magnitude configured to be applied to the first microwave or the second microwave. In some implementations, the predetermined scanning mode includes a fast scanning mode. The control unit may be further configured to, in the fast scanning mode: set a scanning frequency interval defined in the predetermined scanning condition; control the first semiconductor module to output a first plurality of microwaves by changing the frequency of the first microwave based on the scanning frequency interval; determine a VSWR and an isolation value for each of the first plurality of microwaves; and determine whether a microwave among the first plurality of microwaves has the VSWR satisfying a reference VSWR and the isolation value satisfying a reference isolation value.

In some implementations, the control unit is further configured to, based on a determination that the microwave among the first plurality of microwaves has the VSWR satisfying the reference VSWR and the isolation value satisfying the reference isolation value: store a frequency of the microwave among the first plurality of microwaves; reset the scanning frequency interval based on the stored frequency of the microwave among the first plurality of microwaves; based on the reset scanning frequency interval, control the first semiconductor module to output a microwave at an output frequency defined in the predetermined scanning condition; based on output of the microwave at the output frequency, determine a VSWR and an isolation value for the first semiconductor module at the output frequency; determine whether the determined VSWR satisfies the reference VSWR and whether the determined isolation value satisfies the reference isolation value; based on determination results regarding whether the determined VSWR satisfies the reference VSWR and whether the determined isolation value satisfies the reference isolation value, determine whether to store the output frequency; and after determining whether to store the output frequency, determine whether the output frequency corresponds to a last scan frequency defined in the predetermined scanning condition.

In some implementations, the control unit is further configured to, based on a determination that no microwave among the first plurality of microwaves has the VSWR satisfying the reference VSWR and the isolation value satisfying the reference isolation value: reset the scanning frequency interval; control the first semiconductor module to output a second plurality of microwaves by changing the frequency of the first microwave based on the reset scanning frequency interval; determine a VSWR and an isolation value for each of the second plurality of microwaves; and determine whether a microwave among the second plurality of microwaves output from the first semiconductor module has the VSWR satisfying the reference VSWR and the isolation value satisfying the reference isolation value.

In some implementations, the first semiconductor module and the second semiconductor module are configured to operate in an alternate-heating mode. The control unit may be further configured to, in the alternate-heating mode: perform a first scanning operation with the first semiconductor module; based on a result of the first scanning operation, determine a first optimal frequency for the first semiconductor module; store the first optimal frequency for the first semiconductor module; operate the first semiconductor module to generate the first microwave at the stored first optimal frequency; based on operation of the first semiconductor module at the stored first optimal frequency, perform a second scanning operation with the second semiconductor module; based on a result of the second scanning operation, determine a second optimal frequency for the second semiconductor module; store the second optimal frequency for the second semiconductor module; and operate the second semiconductor module to generate the second microwave at the stored second optimal frequency.

In some implementations, the control unit is further configured to: determine a magnitude of a cumulative microwave that is incident to the object from the first semiconductor module and the second semiconductor module; based on a determination that the magnitude of the cumulative microwave is greater than or equal to a reference microwave magnitude, stop operating the first semiconductor module and the second semiconductor module; and based on a determination that the magnitude of the cumulative microwave is less than the reference microwave magnitude, perform the first scanning operation with the first semiconductor module.

In some implementations, the first semiconductor module includes: a first microwave oscillator configured to receive power from the power supply to generate the first microwave; a first microwave amplifier configured to amplify the magnitude of the first microwave generated from the first microwave oscillator; a first output unit configured to output the first microwave amplified from the first microwave amplifier; a first transmitter configured to direct the first microwave amplified from the first microwave amplifier to the first output unit; and a first detector configured to sense at least one of a magnitude of a microwave that is incident from the first semiconductor module to the heating chamber or a magnitude of a microwave that is reflected from the heating chamber to the first semiconductor module. The second semiconductor module may include: a second microwave oscillator configured to receive power from the power supply to generate the second microwave; a second microwave amplifier configured to amplify the magnitude of the second microwave generated from the second microwave oscillator; a second output unit configured to output the second microwave amplified from the second microwave amplifier; a second transmitter configured to direct the second microwave amplified from the second microwave amplifier to the second output unit; and a second detector configured to sense at least one of a magnitude of a microwave that is incident from the second semiconductor module to the heating chamber or a magnitude of a microwave that is reflected from the heating chamber to the second semiconductor module.

In some implementations, the control unit is further configured to: control the first microwave oscillator to generate the first microwave at the frequency; control the first microwave amplifier to adjust at least one of the magnitude or the phase of the first microwave; receive, from the first detector, information about the magnitude of the first microwave; and detect a heated state of the object accommodated in the heating chamber. In some examples, the first microwave oscillator includes a radio frequency oscillator, the first microwave amplifier includes a solid-state power amplifier (SSPA), the first transmitter includes an isolator configured to transmit the first microwave in a direction, and the first detector includes a directional coupler. In some implementations, each of the first semiconductor module and the second semiconductor module includes a solid-state power module (SSPM).

In some implementations, the microwave heating system may further include: a first antenna configured to transmit the first microwave generated from the first semiconductor module to the heating chamber; and a second antenna configured to transmit the second microwave generated from the second semiconductor module to the heating chamber. In some examples, at least one of the first antenna or the second antenna includes a plurality of antennas.

Further specific effects of the present disclosure as well as the effects as described above will be described in conduction with illustrations of specific details for carrying out the invention.

BRIEF DESCRIPTION OF DRAWINGS

Throughout the drawings, like reference numerals refer to like elements.

DETAILED DESCRIPTION

An example microwave heating system according to one implementation of the present disclosure will be illustrated.

Figure 1:
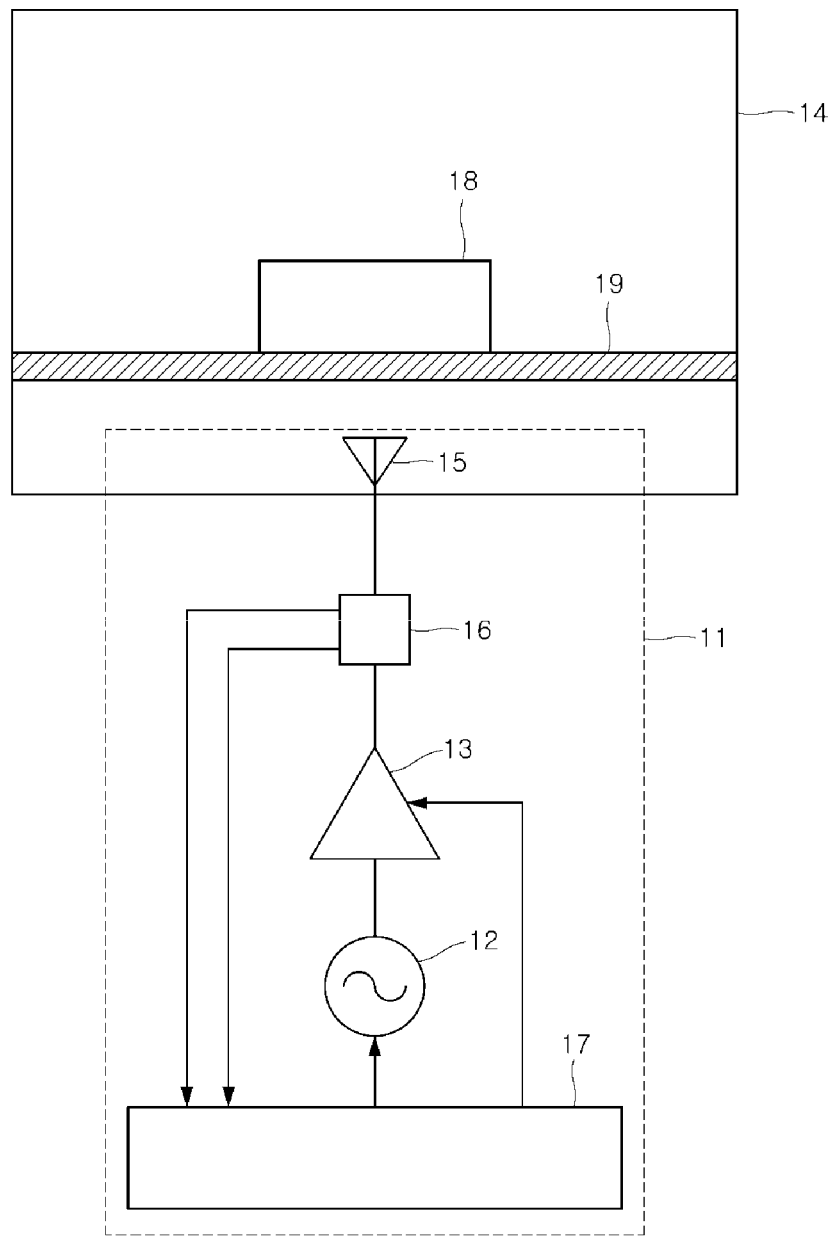
FIG. 1 and FIG. 2 are schematic diagrams illustrating example microwave ovens in related art.
Figure 2:
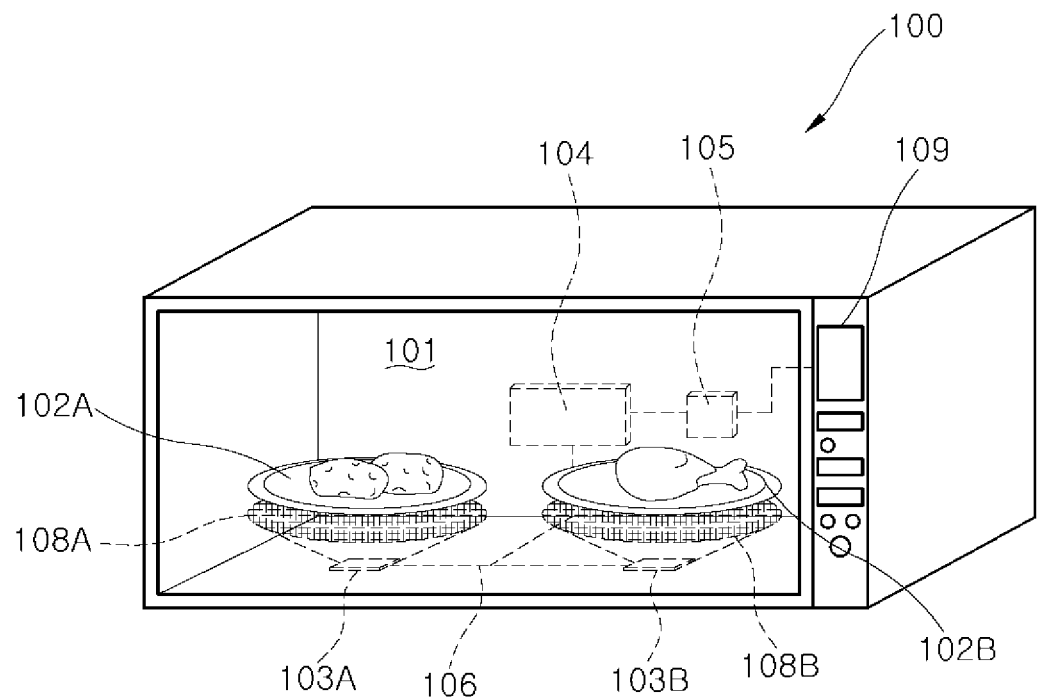
Figure 3:
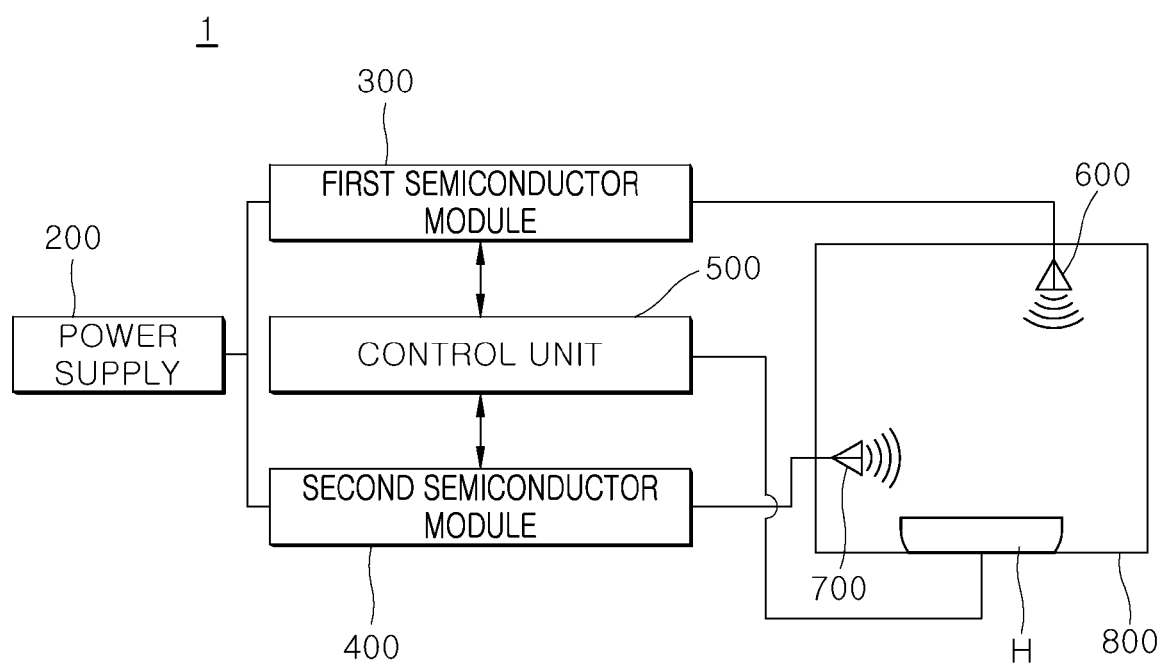
FIG. 3 is a schematic diagram illustrating an example microwave heating system according to one implementation of the present disclosure.
Figure 4:
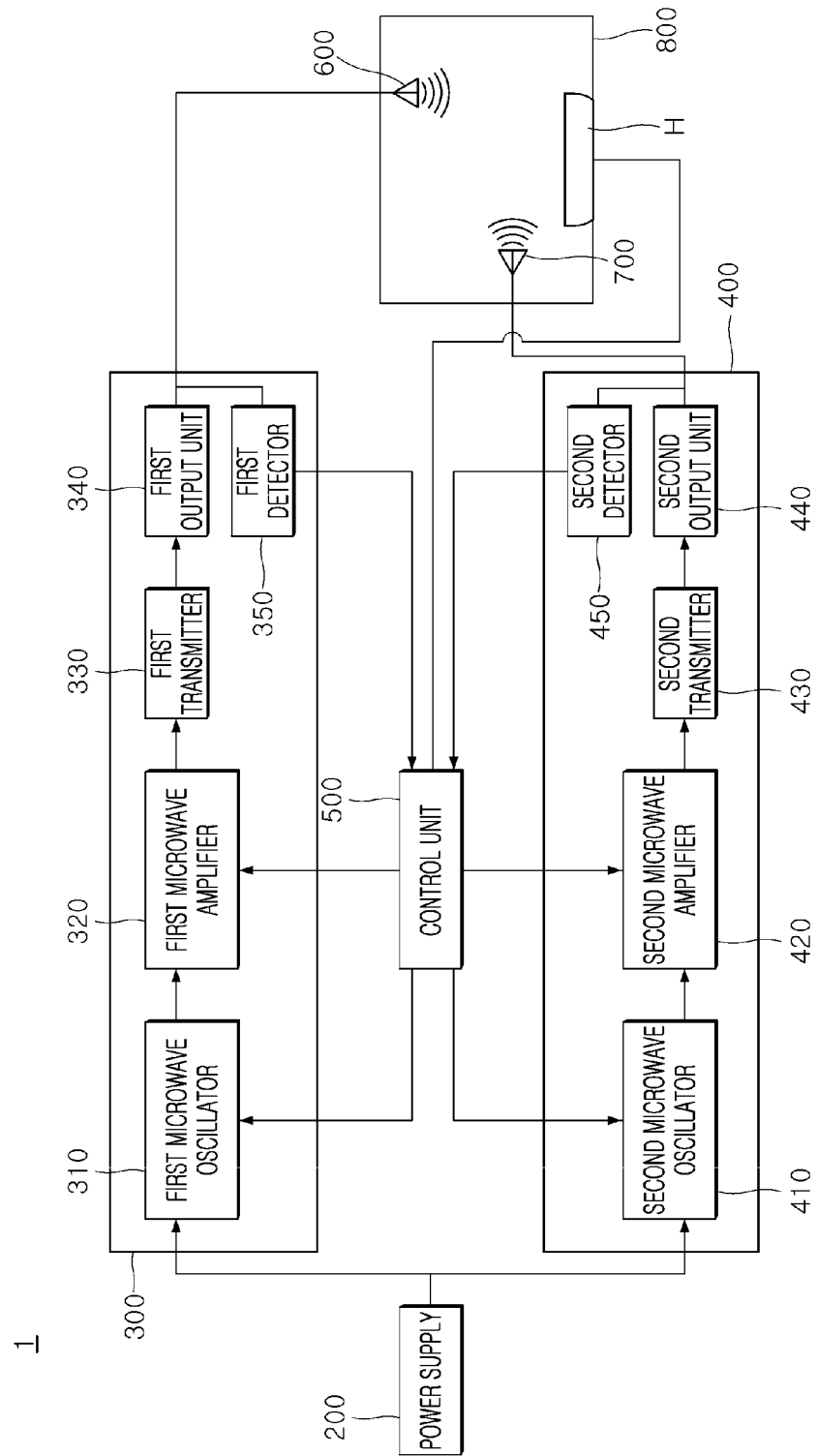
FIG. 4 is a schematic diagram illustrating example first and second semiconductor modules illustrated in FIG. 3.

FIG. 3 is a schematic diagram illustrating a microwave heating system according to one embodiment of the present disclosure. FIG. 4 is a schematic diagram illustrating first and second semiconductor modules illustrated in FIG. 3.

Referring to FIG. 3 and FIG. 4, a microwave heating system 1 according to one embodiment of the present disclosure may include a power supply 200, first and second semiconductor modules 300 and 400, a control unit 500, first and second antennas 600 and 700, and a heating chamber 800.

In some implementations, the microwave heating system 1 may be, for example, a microwave oven. However, the present discourse is not limited thereto. Alternatively, the microwave heating system 1 may include a microwave heating system such as a heating system using dielectric heating, a food waste treatment system, or a semiconductor manufacturing system.

FIGS. 3 and 4 illustrate only two semiconductor modules and only two antennas. The present disclosure is not limited thereto. That is, each of the number of the semiconductor modules and the number of the antennas may be three or more. However, in one embodiment of the present disclosure, for convenience of illustration, the configuration having the two semiconductor modules and the two antennas will be exemplified.

In some examples, the power supply 200 may supply power to each of the first and second semiconductor modules 300 and 400.

In some implementations, the power from the power supply 200 may also be supplied to remaining components (i.e., the control unit 500, the first and second antennas 600 and 700, etc.) The details of this will be omitted.

The first semiconductor module 300 may receive the power from the power supply 200 and then generate microwave. The first semiconductor module 300 may include a solid state power module (SSPM), for example.

For example, the first semiconductor module 300 may receive the power (i.e., electrical energy) from the power supply 200 and, may convert the supplied power into electromagnetic wave energy (i.e., microwave) using a semiconductor oscillator scheme, and may provide the same to the first antenna 600.

In some examples, the first semiconductor module 300 may include a first microwave oscillator 310 for receiving power from the power supply 200 to generate a microwave; a first microwave amplifier 320 for amplifying a magnitude of the microwave generated from the first microwave oscillator 310; a first output unit 340 for outputting the amplified microwave from the first microwave amplifier 320; a first transmitter 330 for directing the amplified microwave from the first microwave amplifier 320 to the first output unit 340; and a first detector 350 for sensing a magnitude of the microwave incident from the first semiconductor module 300 into a heating chamber 800, or a magnitude of the microwave reflected to the first semiconductor module 300 from the heating chamber 800.

In this connection, the first microwave oscillator 310 may generate the microwave and deliver the same to the first microwave amplifier 320. The first microwave oscillator 310 may include a radio frequency oscillator (RFO). Further, a frequency of the microwave as generated from the first microwave oscillator 310 may be controlled by the control unit 500.

In some implementations, the first microwave amplifier 320 may receive the microwave from the first microwave oscillator 310, amplify a magnitude of the delivered microwave, and deliver the same to the first transmitter 330. Further, the first microwave amplifier 320 may include, for example, a solid state power amplifier (SSPA). At least one of the magnitude or phase of the microwave as amplified from the first microwave amplifier 320 may be controlled by the control unit 500.

In some implementations, the first transmitter 330 may deliver the amplified microwave from the first microwave amplifier 320 to the first output unit 340. The first transmitter 330 may include, for example, an isolator. In some implementations, the first transmitter 330 serves to allow the output (i.e., amplified microwave) of the first microwave amplifier 320 to be directed in one direction without being reflected.

In some implementations, the first detector 350 may be connected between the first output unit 340 and the first antenna 600. The first detector 350 may sense the magnitude of the microwave incident on the heating chamber 800 from the first semiconductor module 300 or the magnitude of the microwave reflected from the heating chamber 800 to the first semiconductor module 300. Then, the first detector 350 may supply the control unit 500 with information about the magnitude of the sensed microwave. Further, the first detector 350 may include, for example, a directional coupler (DC).

In some implementations, the first output unit 340 may output the microwave delivered from the first transmitter 330 to the first antenna 600.

The second semiconductor module 400 may receive the power from the power supply 200 and then generate microwave. The second semiconductor module 400 may include a solid state power module (SSPM), for example.

Specifically, the second semiconductor module 400 may receive the power (i.e., electrical energy) from the power supply 200 and, may convert the supplied power into electromagnetic wave energy (i.e., microwave) using a semiconductor oscillator scheme, and may provide the same to the second antenna 700.

In some implementations, the second semiconductor module 400 may include a second microwave oscillator 410 for receiving power from the power supply 200 to generate a microwave; a second microwave amplifier 420 for amplifying a magnitude of the microwave generated from the second microwave oscillator 410; a second output unit 440 for outputting the amplified microwave from the second microwave amplifier 420; a second transmitter 430 for directing the amplified microwave from the second microwave amplifier 420 to the second output unit 440; and a second detector 450 for sensing a magnitude of the microwave incident from the second semiconductor module 400 into a heating chamber 800, or a magnitude of the microwave reflected to the second semiconductor module 400 from the heating chamber 800.

In some implementations, the second microwave oscillator 410 may generate the microwave and deliver the same to the second microwave amplifier 420. The second microwave oscillator 410 may include a radio frequency oscillator (RFO). Further, a frequency of the microwave as generated from the second microwave oscillator 410 may be controlled by the control unit 500.

In some implementations, the second microwave amplifier 420 may receive the microwave from the second microwave oscillator 410, amplify a magnitude of the delivered microwave, and deliver the same to the second transmitter 430. Further, the second microwave amplifier 420 may include, for example, a solid state power amplifier (SSPA). At least one of the magnitude or phase of the microwave as amplified from the second microwave amplifier 420 may be controlled by the control unit 500.

In some implementations, the second transmitter 430 may deliver the amplified microwave from the second microwave amplifier 420 to the second output unit 440. The second transmitter 430 may include, for example, an isolator. In some implementations, the second transmitter 430 serves to allow the output (i.e., amplified microwave) of the second microwave amplifier 420 to be directed in one direction without being reflected.

In some implementations, the second detector 450 may be connected between the second output unit 440 and the second antenna 700. The second detector 450 may sense the magnitude of the microwave incident on the heating chamber 800 from the second semiconductor module 400 or the magnitude of the microwave reflected from the heating chamber 800 to the second semiconductor module 400. Then, the second detector 450 may supply the control unit 500 with information about the magnitude of the sensed microwave. Further, the second detector 450 may include, for example, a directional coupler (DC).

In some implementations, the second output unit 440 may output the microwave delivered from the second transmitter 430 to the second antenna 700.

The control unit 500 may control operations of the first and second semiconductor modules 300 and 400, respectively.

For example, the control unit 500 may be designed to control at least one of the frequency, phase, or magnitude of each of the microwaves as generated from the first and second semiconductor modules 300 and 400, respectively, so as to improve the uniform heating performance for the object H.

That is, the control unit 500 may control the first microwave oscillator 310 to adjust the frequency of the microwave as generated from the first microwave oscillator 310. The control unit may control the first microwave amplifier 320 to adjust at least one of the magnitude, or phase of the amplified microwave from the first microwave amplifier 320. Further, the control unit 500 may receive information about the magnitude of the microwave sensed from the first detector 350, and, then, may determine, based on the information, a heated state of the object H housed in the heating chamber 800.

In the same manner, the control unit 500 may control the second microwave oscillator 410 to adjust the frequency of the microwave as generated from the second microwave oscillator 410. The control unit may control the second microwave amplifier 420 to adjust at least one of the magnitude or phase of the amplified microwave from the second microwave amplifier 420. Further, the control unit 500 may receive information about the magnitude of the microwave sensed from the second detector 450, and, then, may determine, based on the information, a heated state of the object H housed in the heating chamber 800.

In some implementations, the control unit 500 may control a heating operation by the first and second semiconductor modules 300 and 400, and a frequency scanning operation for the first and second semiconductor modules 300 and 400, respectively. Further details of this will be described later.

In some implementations, the first antenna 600 may feed the microwave generated from the first semiconductor module 300 to the heating chamber 800.

Specifically, the first antenna 600 may receive the microwave from the first output unit 340 and feed the same to the heating chamber 800.

Further, the second antenna 700 may feed the microwave generated from the second semiconductor module 400 to the heating chamber 800.

Specifically, the second antenna 700 may receive the microwave from the second output unit 440 and feed the same to the heating chamber 800.

In some implementations, the first antenna 600 and the second antenna 700 may be positioned at different locations, as illustrated in FIGS. 3 and 4.

The microwaves as generated from the first and second semiconductor modules 300 and 400 may be supplied into the heating chamber 800 in which the object H may be accommodated.

In some examples, a door for inserting and withdrawing the object H into and out of the heating chamber 800 may disposed on an open face of the heating chamber 800. Further, each of faces of the heating chamber 800 where the door is not disposed may be formed of a shielding plate made of a metal material. As a result, the microwaves supplied into the heating chamber 800 may be confined inside the heating chamber 800.

In some implementations, although not illustrated in the drawings, the microwave heating system 1 may further include an input interface that may be supplied with input associated with a heating mode or scanning mode from a user. The input interface may be implemented, for example, as a touch screen or as a button. The input interface may deliver information about the heating mode or scanning mode as received from the user to the control unit 500.

The microwave heating system 1 according to one embodiment of the present disclosure has the configurations and features as described above. In this regard, referring to FIG. 5, a heating method by the microwave heating system 1 will be described below.

Figure 5:
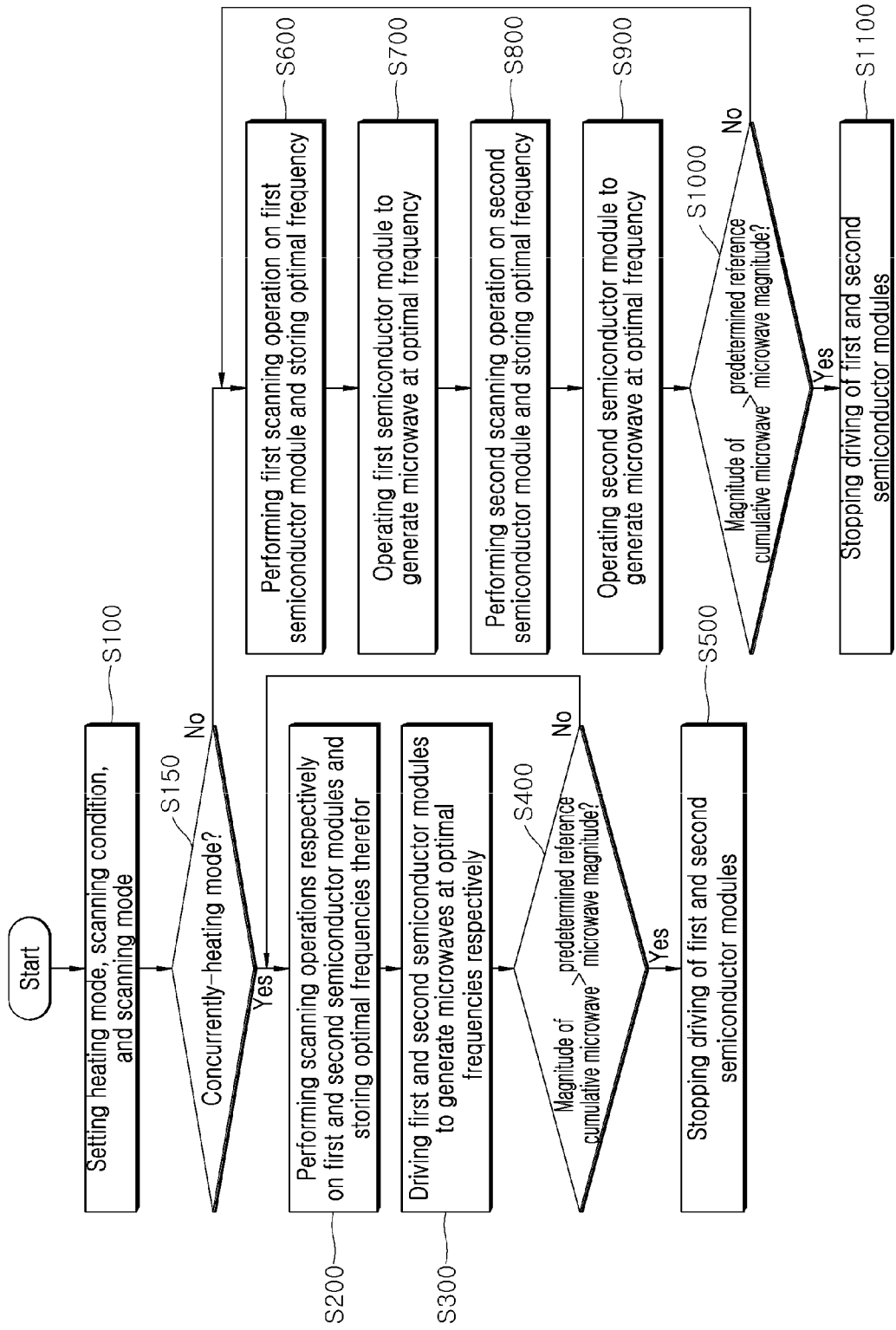
FIG. 5 is a flow chart illustrating an example heating method by the microwave heating system of FIG. 3.

FIG. 5 is a flow chart illustrating a heating method by the microwave heating system of FIG. 3.

Referring to FIG. 4 and FIG. 5, first, the control unit 500 may set a heating mode, a scanning condition, and a scanning mode (S100).

In some examples, the control unit 500 receives information on the heating mode, scanning condition, and scanning mode from an input interface. Then, the control unit 500 may set the heating mode, scanning condition, and scanning mode for the microwave heating system 1 based on the received information.

In this connection, the heating mode may include, for example, a concurrently-heating mode (concurrently-heating operations of the first and second semiconductor modules 300 and 400, and an alternating-heating mode (alternating-heating operations of the first and second semiconductor modules 300 and 400). Further, the scanning mode may include, for example, a normal scanning mode and a fast scanning mode. The scanning condition may include, for example, a to-be-scanned full frequency band (e.g., 2.4 GHz to 2.5 GHz), and a combination of a frequency, a phase and a magnitude to be scanned (e.g., a combination of 2.4 GHz, 120 deg, 250 W). The present disclosure is not limited thereto.

In some implementations, when the heating mode is set to the concurrently-heating mode (S150), the control unit 500 performs scanning operations on the first and second semiconductor modules 300 and 400 and stores optimal frequencies therefor (S200).

Specifically, the control unit 500 sequentially performs scanning operations on the first and second semiconductor modules 300 and 400 based on a predetermined scanning condition and a predetermined scanning mode respectively. Then, the control unit 500 may store an optimal frequency for each of the first and second semiconductor modules 300 and 400. That is, the control unit 500 may store the optimal frequency for the first semiconductor module 300 based on the scanning operation result for the first semiconductor module 300, while the control unit 500 may store the optimal frequency for the second semiconductor module 400 based on the scanning operation result for the second semiconductor module 400.

Details of the scanning operations will be described later.

Once the optimal frequencies are stored, the control unit 500 drives the first and second semiconductor modules 300 and 400 to generate microwaves at the optimal frequencies (S300).

Specifically, the control unit 500 may be configured to drive each of the first and second semiconductor modules 300 and 400 to generate each of the microwaves at each of the optimal frequencies stored therein.

That is, the control unit 500 may control the first microwave oscillator 310 to allow the first semiconductor module 300 to generate a microwave of the optimal frequency, while the control unit 500 may control the second microwave oscillator 410 to allow the second semiconductor module 400 to generate a microwave of the optimal frequency.

When the first and second semiconductor modules are activated (S300), the control unit may compare a magnitude of a cumulative microwave with a predetermined reference microwave magnitude (S400).

In some examples, the control unit 500 compares the magnitude of the cumulative microwave incident on the to-heated object H via the driving of the first and second semiconductor modules 300 and 400 with the predetermined reference microwave magnitude, the control unit may determine whether to stop driving the first and second semiconductor modules 300 and 400 based on the comparison result.

That is, the control unit 500 may determine whether to stop driving at least one of the first semiconductor module 300 or the second semiconductor module 400 based on the comparison result.

In some examples, if the magnitude of the cumulative microwave incident on the object is greater than or equal to the predetermined microwave magnitude, the control unit 500 may stop driving the first and second semiconductor modules 300 and 400 (S500). Conversely, if the magnitude of the cumulative microwave incident on the object is smaller than the predetermined microwave magnitude, the control unit 500 may perform the sequential scanning operations again on the first and second semiconductor modules 300 and 400 (S200).

In some implementations, when, in the above-described operation S150, the heating mode is not set to the concurrently-heating mode (i.e., the heating mode is set to the alternately-heating mode), the control unit 500 performs the scanning operation on the first semiconductor module 300 and stores the optimal frequency S600.

Specifically, the control unit 500 may perform the scanning operation (that is, first scanning operation) on the first semiconductor module 300 based on predetermined scanning condition and scanning mode, and, then, the control unit may store the optimal frequency for the first semiconductor module 300. That is, the control unit 500 may store the optimal frequency for the first semiconductor module 300 based on the scanning operation result for the first semiconductor module 300.

When the optimal frequency is stored (S600), the control unit 500 drives the first semiconductor module 300 to generate a microwave at the optimal frequency (S700).

Specifically, the control unit 500 may drive the first semiconductor module 300 such that the first semiconductor module 300 may generate microwaves at the stored optimal frequency.

That is, the control unit 500 may control the first microwave oscillator 310 to allow the first semiconductor module 300 to generate the microwave of the optimal frequency.

When the first semiconductor module is activated (S700), the control unit performs the scanning operation (that is, second scanning operation) on the second semiconductor module 400 and stores the optimal frequency (S800).

Specifically, the control unit 500 may perform the scanning operation on the second semiconductor module 400 based on predetermined scanning condition and scanning mode, and, then, the control unit may store the optimal frequency for the second semiconductor module 400. That is, the control unit 500 may store the optimal frequency for the second semiconductor module 400 based on the scanning operation result for the second semiconductor module 400.

When the optimal frequency is stored (S800), the control unit 500 drives the second semiconductor module 400 to generate a microwave at the optimal frequency.

Specifically, the control unit 500 may drive the second semiconductor module 400 such that the second semiconductor module 400 may generate microwaves at the stored optimal frequency.

That is, the control unit 500 may control the second microwave oscillator 410 to allow the second semiconductor module 400 to generate the microwave of the optimal frequency.

When the second semiconductor module is activated (S900), the control unit may compare a magnitude of a cumulative microwave to a predetermined reference microwave magnitude.

Specifically, the control unit 500 compares the magnitude of the cumulative microwave incident on the to-heated object H via the driving of the first and second semiconductor modules 300 and 400 with the predetermined reference microwave magnitude, the control unit may determine whether to stop driving the first and second semiconductor modules 300 and 400 based on the comparison result.

That is, the control unit 500 may determine whether to stop driving at least one of the first semiconductor module 300 or the second semiconductor module 400 based on the comparison result.

Furthermore, if the magnitude of the cumulative microwave incident on the object is greater than or equal to the predetermined microwave magnitude, the control unit 500 may stop driving the first and second semiconductor modules 300 and 400 (S1100). Conversely, if the magnitude of the cumulative microwave incident on the object is smaller than the predetermined microwave magnitude, the control unit 500 may perform the sequential scanning operations again on the first and second semiconductor modules 300 and 400.

In this way, the microwave heating system 1 uniformly distributes the object H via the concurrently-heating or alternately-heating operation of the first and second semiconductor modules 300 and 400.

Hereinafter, a frequency scanning method for the microwave heating system 1 will be described with reference to FIGS. 6 to 11.

Figure 6:
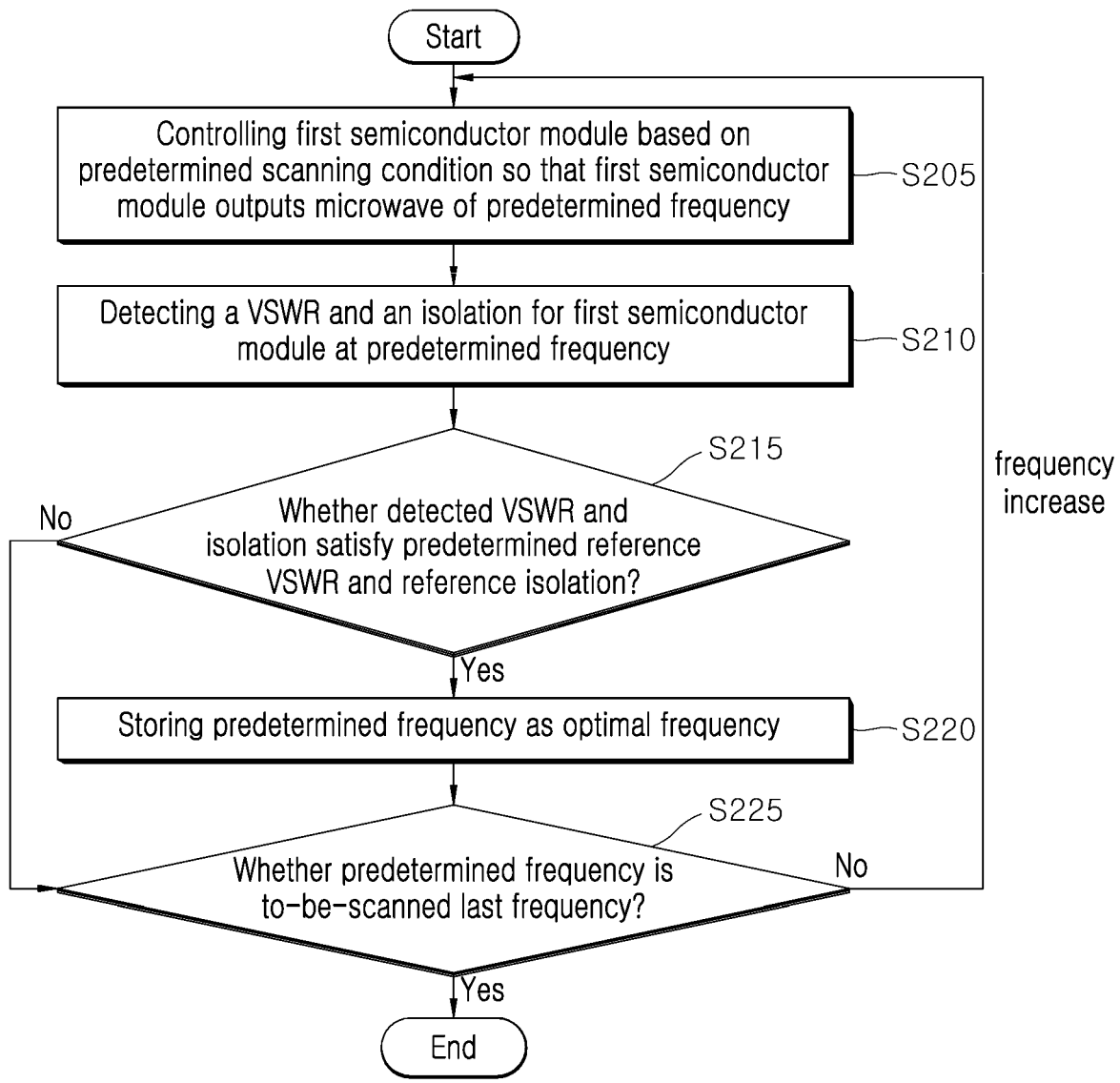
FIG. 6 is a flow chart illustrating an example frequency scanning method by the microwave heating system of FIG. 3.
Figure 7:
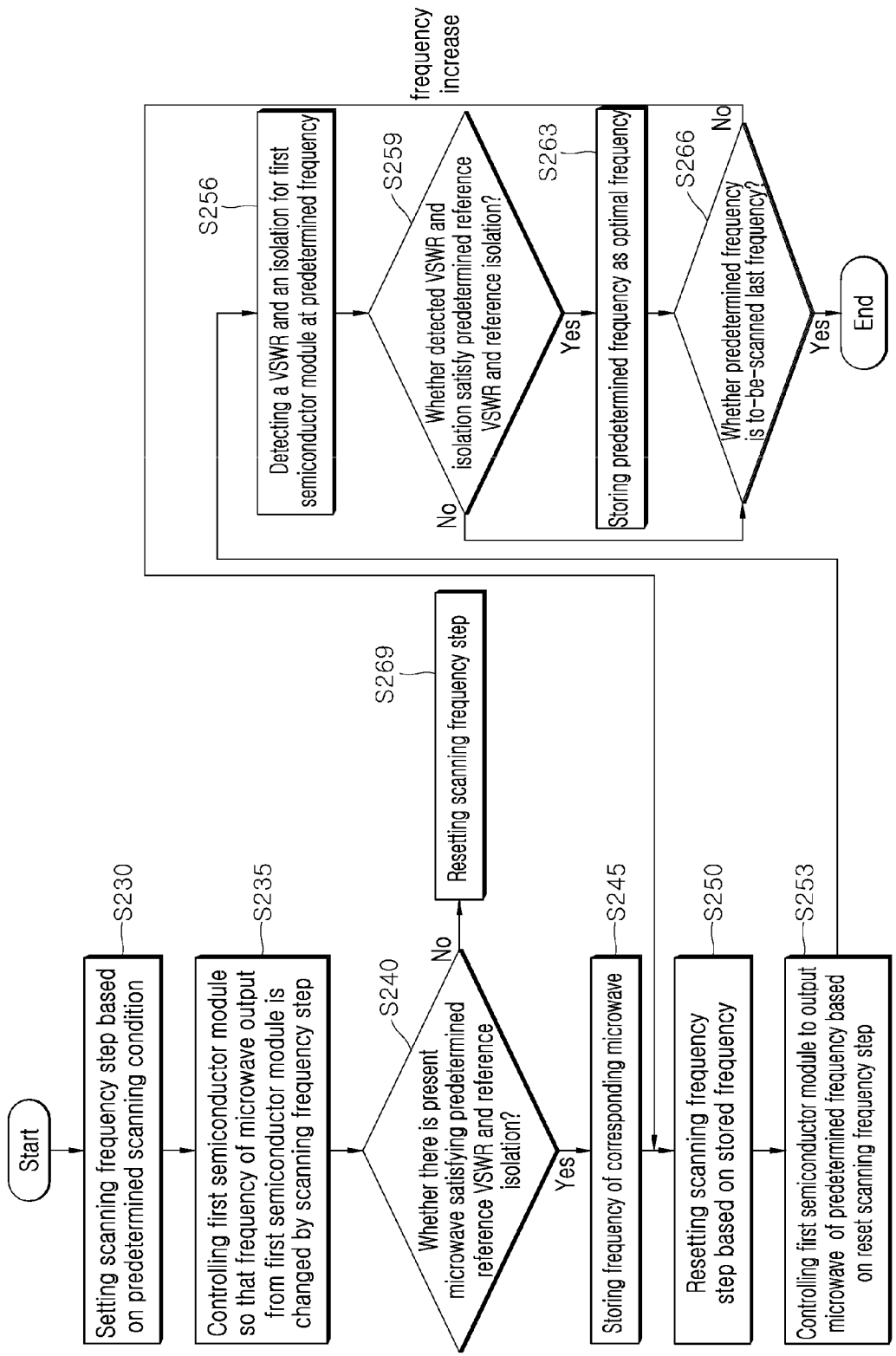
FIG. 7 and FIG. 8 are flow charts illustrating examples of a frequency scanning method by the microwave heating system of FIG. 3.
Figure 8:
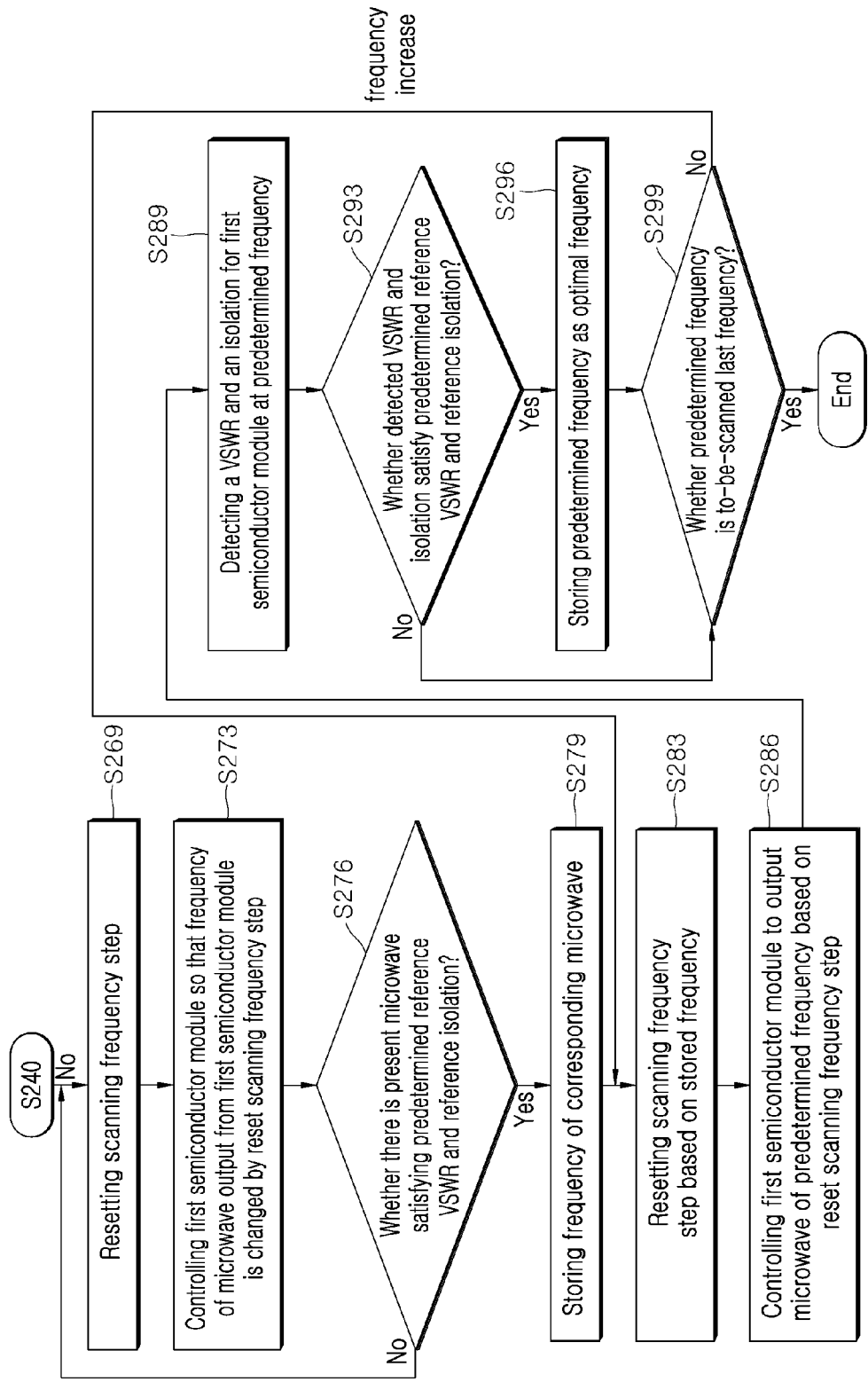
Figure 9:
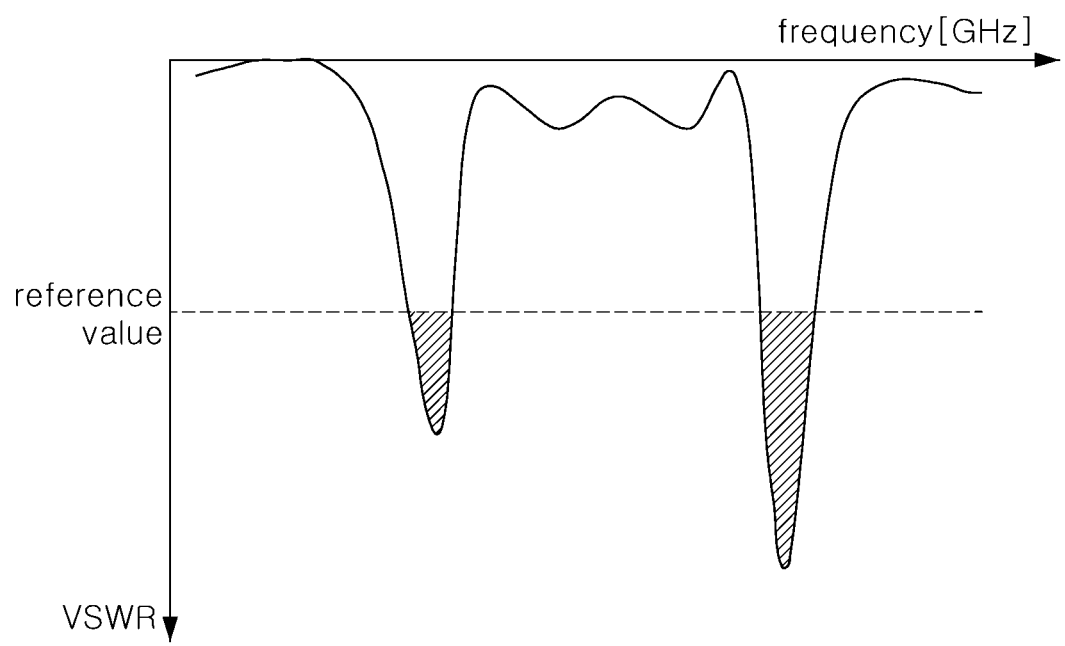
FIG. 9 is a graph illustrating an example of an optimal frequency selection method by the microwave heating system of FIG. 3.
Figure 10:
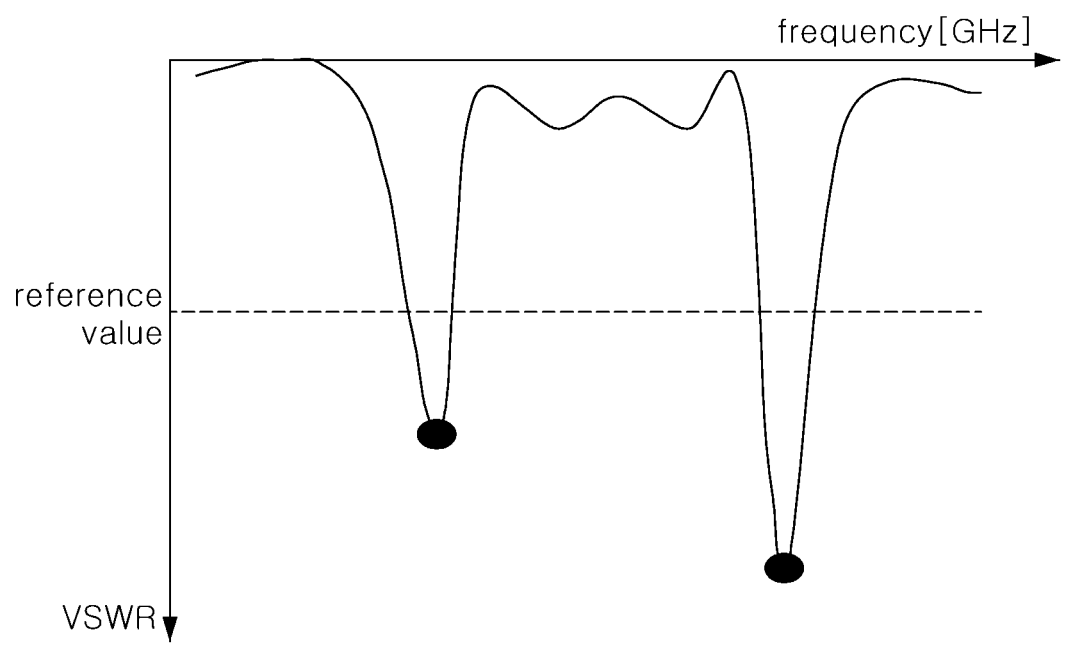
FIG. 10 is a graph illustrating an example of an optimal frequency selection method by the microwave heating system of FIG. 3.
Figure 11:
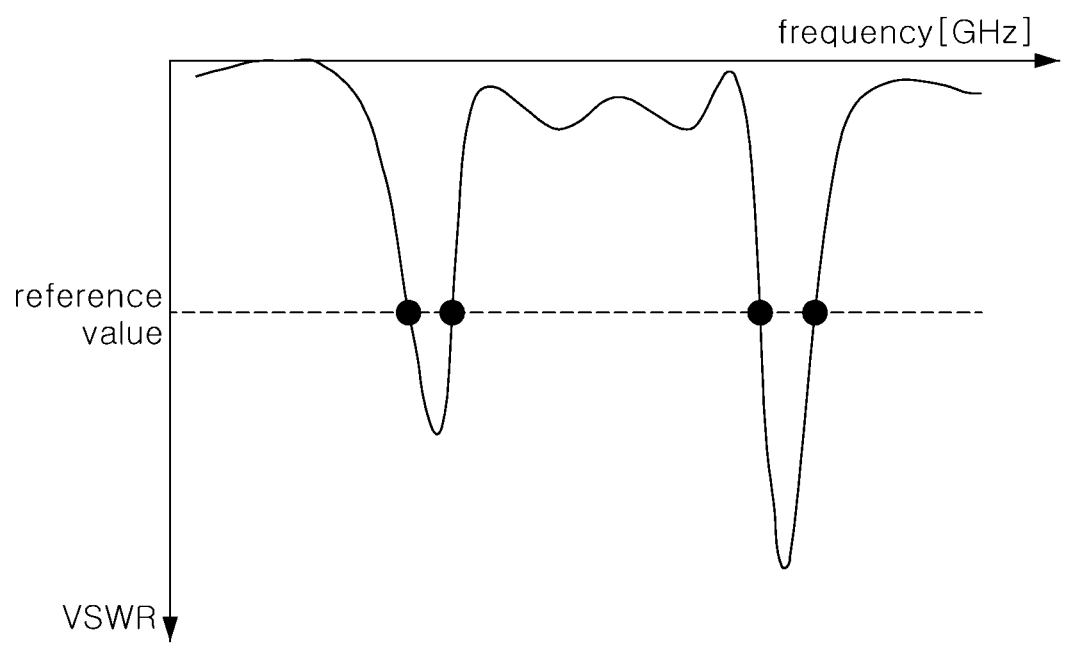
FIG. 11 is a graph illustrating an example of an optimal frequency selection method by the microwave heating system of FIG. 3.

FIG. 6 is a flow chart illustrating one example of a frequency scanning method by the microwave heating system of FIG. 3. FIG. 7 and FIG. 8 are flow charts illustrating another example of a frequency scanning method by the microwave heating system of FIG. 3. FIG. 9 is a graph illustrating one example of an optimal frequency selection method by the microwave heating system of FIG. 3. FIG. 10 is a graph illustrating another example of an optimal frequency selection method by the microwave heating system of FIG. 3. FIG. 11 is a graph illustrating still another example of an optimal frequency selection method by the microwave heating system of FIG. 3.

In some implementations, the present frequency scanning method may be applied to the scanning operations of operations S200, S600, and S800 of FIG. 5 above. Further, the frequency scanning methods applied to the first semiconductor module 300 and the second semiconductor module 400 respectively may be identical with each other. Thus, an example of the frequency scanning method applied to the first semiconductor module 300 will be exemplified below.

First, referring to FIG. 4 and FIG. 6, one example (i.e., a normal scanning mode) of the frequency scanning method by the microwave heating system 1 is illustrated.

Referring to FIGS. 4 and 6, first, the method controls the first semiconductor module 300 according to a predetermined scanning condition so that the first semiconductor module 300 outputs a microwave of a predetermined frequency (S205).

Specifically, the control unit 500 may control the first semiconductor module 300 according to a predetermined scanning condition so that the first semiconductor module 300 outputs a microwave of a predetermined frequency.

Further, when the control unit 500 controls the first semiconductor module 300 to output the microwave having the predetermined frequency based on the predetermined scanning condition, the control unit 500 may also control a phase and a magnitude of the microwave based on the predetermined scanning condition.

That is, the control unit 500 may control the first microwave oscillator 310 to adjust the frequency of the output microwave to the predetermined frequency. In addition, the control unit 500 may control the first microwave amplifier 320 to adjust the phase and magnitude of the output microwave to a predetermined phase and magnitude.

In some implementations, the predetermined frequency may be in a range of the to-be-scanned full frequency band.

When the microwave is output (S205), the control unit 500 detects a voltage standing wave ratio (VSWR) and an isolation for the first semiconductor module at the predetermined frequency (S210).

In this connection, the VSWR of the first semiconductor module 300 may include a ratio parameter between a magnitude of the microwave output from the first semiconductor module 300 and a magnitude of the microwave as reflected from the heating chamber 800 back to the first semiconductor module 300.

In this connection, the VSWR of the first semiconductor module 300 may refer to a parameter indicating a performance of the first semiconductor module 300 (i.e., how well the microwave output from the first semiconductor module 300 emits or progresses). More specifically, the VSWR of the first semiconductor module 300 may refer to the emissivity (or progression) of the microwave output from the first antenna 600 to the heating chamber 800.

For example, the isolation of the first semiconductor module 300 (i.e., the isolation of the first semiconductor module 300 relative to the second semiconductor module 400) may include a ratio parameter between a magnitude of the microwave as output from the first semiconductor module 300 and a magnitude of the output microwave as reflected from the heating chamber 800 and incident on the second semiconductor module 400. That is, the isolation of the first semiconductor module 300 may be an indicator of a stability of the first semiconductor module 300 relative to the second semiconductor module 400. In some examples, the isolation of the first semiconductor module 300 may mean an isolation of the first antenna 600 relative to the second antenna 700.

Accordingly, when the isolation of the first semiconductor module 300 is low, the first and second antennas 600 and 700 have a large influence on each other, resulting in poor heating performance of the object H. Further, this may cause mutual great damage between the antennas.

In some implementations, the first detector 350 senses magnitudes of microwaves input to and output from the first semiconductor module 300 and feeds them to the control unit 500. At this same time, the second detector 450 senses the magnitudes of microwaves input to and output from the second semiconductor module 400 and feeds them to the control unit 500. As such, the control unit 500 may determine the VSWR and isolation for the first semiconductor module 300 as described above.

When the VSWR and isolation of the first semiconductor module 300 are detected, the method may analyze whether the detected VSWR and isolation satisfy a predetermined reference VSWR and reference isolation (S215).

Specifically, the control unit 500 may analyze whether the detected VSWR and isolation satisfy the predetermined reference VSWR and reference isolation.

In this connection, referring to FIGS. 9 to 11, a method for analyzing, by the control unit 500, whether the detected VSWR and isolation satisfy the predetermined reference VSWR and reference isolation will be described. This method may referred to as an optimal frequency selection method as used herein. In this connection, the method of selecting the optimal frequency with reference to the isolation may be identical with, in terms of the principle, but different from, in term of the referenced parameter (that is, whether the parameter is the VSWR or isolation), the method for selecting the optimal frequency with reference to the VSWR. Thus, the method of selecting the optimal frequency with reference to the VSWR will be exemplified blow. It may be appreciated that the principle of the method of selecting the optimal frequency with reference to the VSWR may be equally applied to the method of selecting the optimal frequency with reference to the isolation.

First, referring to FIG. 9, when the detected VSWR is equal to or smaller than a reference value (i.e., a predetermined reference VSWR), the optimal frequency selection method as illustrated in FIG. 9 stores the predetermined frequency as the optimal frequency. That is, in this case, all the frequencies corresponding to the VSWRs equal to or smaller than the reference value (i.e., the predetermined reference VSWR) may be stored or selected as the optimal frequency.

Alternatively, in the optimal frequency selection method as illustrated in FIG. 10, the predetermined frequency may be stored or selected as the optimal frequency when the detected VSWR is a minimum VSWR below the reference value (that is, below the predetermined reference VSWR). That is, in this case, only a frequency corresponding to the minimum VSWR among the VSWRs below the reference value (i.e., the predetermined reference VSWR may be stored (i.e., selected) as the optimal frequency.

Alternatively, in the optimal frequency selection method as illustrated in FIG. 11, the predetermined frequency may be stored or selected as the optimal frequency when the detected VSWR is equal to the reference value (that is, the predetermined reference VSWR). That is, in this case, only a frequency corresponding to the VSWR equal to the reference value (i.e., the predetermined reference VSWR may be stored (i.e., selected) as the optimal frequency.

Referring again to FIG. 4 and FIG. 6, when the detected VSWR and isolation satisfy the predetermined reference VSWR and reference isolation respectively (S215), the control unit 500 may store the predetermined frequency as the optimal frequency (S220). Subsequently, the control unit may determine whether the predetermined frequency is the to-be-scanned last frequency (S225).

Conversely, when the detected VSWR and isolation do not satisfy the predetermined reference VSWR and reference isolation, the control unit may immediately determine whether the predetermined frequency is the to-be-scanned last frequency (S225).

When the predetermined frequency is not the to-be scanned last frequency, the control unit 500 may control the first semiconductor module 300 according to the predetermined scanning condition (i.e., to increase the frequency of the microwave output from the first semiconductor module 300) such that the first semiconductor module 300 outputs the microwave having a frequency higher than the predetermined frequency.

However, when the predetermined frequency is the to-be-scanned last frequency, the control unit 500 terminates the scanning operation on the first semiconductor module 300. Then, the control unit 500 may initiate a scanning operation on the second semiconductor module 400.

In this connection, the scanning operation on the second semiconductor module 400 may be performed on the same principle as the scanning operation on the first semiconductor module 300 as described above.

As described above, one example (i.e., the normal scanning mode) of the frequency scanning method by the microwave heating system 1 may be performed. Hereinafter, another example (i.e., the fast scanning mode) of the frequency scanning method by the microwave heating system 1 will be exemplified.

Referring to FIG. 4 and FIG. 7, first, the method may set a scanning frequency step based on a predetermined scanning condition. The scanning frequency step may be a frequency interval (e.g., an increment or decrement) between frequencies.

Specifically, the control unit 500 may set a scanning frequency step based on a predetermined scanning condition (S230). For example, when the to-be-scanned full frequency band is 2.4 GHz to 2.5 GHz, a 10 MHz unit may be set as the scanning frequency step within 2.4 GHz to 2.5 GHz.

When the scanning frequency step has been set (S230), the method controls the first semiconductor module 300 so that a frequency of the microwave output from the first semiconductor module 300 is changed by the scanning frequency step (S235).

Specifically, the control unit 500 may control the first semiconductor module 300 so that the frequency of the microwave output from the first semiconductor module 300 is changed by the predetermined scanning frequency step.

In this connection, while the control unit 500 controls the first semiconductor module 300 so that the frequency of microwaves output from the first semiconductor module 300 is changed by the scanning frequency step, the control unit 500 may control the first semiconductor module 300 to change a phase and magnitude of the microwave based on the predetermined scanning condition.

That is, the control unit 500 controls the first microwave oscillator 310 so that the frequency of the output microwave may be changed by the predetermined scanning frequency step. At the same time, the control unit 500 may control the first microwave amplifier 320 to adjust the phase and magnitude of the output microwave to a predetermined phase and magnitude respectively.

For example, when the scanning frequency step is 10 MHz, the frequency of the microwave as output from the first semiconductor module 300 may be varied by 10 MHz.

The varied frequency of the output microwave may be in a range of the to-be-scanned full frequency band.

If the first semiconductor module 300 is controlled to change the frequency of the microwave output from the first semiconductor module 300, the method may determine whether there is present or absent a microwave having a VSWR and an isolation satisfying the predetermined reference VSWR and reference isolation among the output microwaves among the output microwaves.

In this connection, the method may determine, using the operation S215 of FIG. 6, whether there is present or absent a microwave having a VSWR and an isolation satisfying the predetermined reference VSWR and reference isolation among the output microwaves (S240).

When there is present the microwave having the VSWR and the isolation satisfying the predetermined reference VSWR and reference isolation among the output microwaves (S240), the control unit 500 stores the frequency of the corresponding microwave (S245). The control unit may then reset the scanning frequency step based on the stored frequency of the microwave (S250).

For example, when the frequency of the microwave satisfying the predetermined reference VSWR and reference isolation is 2.45 GHz, the control unit may reset the scanning frequency step as 1 MHz unit within a range of ±5 MHz around the 2.45 GHz.

When the scanning frequency step is reset (S245), the method controls the first semiconductor module 300 so that the first semiconductor module 300 outputs a microwave of a predetermined frequency based on the reset scanning frequency step (S253).

Specifically, the control unit 500 may control the first semiconductor module 300 such that the first semiconductor module 300 outputs a microwave of a predetermined frequency based on the resetting of the scanning frequency step.

For example, the control unit 500 may control the first semiconductor module 300 so that the first semiconductor module 300 outputs a microwave of a frequency corresponding to −5 MHz from 2.45 GHz.

In this connection, while the control unit 500 may control the first semiconductor module 300 such that the first semiconductor module 300 outputs a microwave of a predetermined frequency based on the resetting of the scanning frequency step, the control unit 500 may control the first semiconductor module 300 so that the first semiconductor module 300 outputs the microwave of a predetermined phase and magnitude based on the predetermined scanning condition.

That is, the control unit 500 may control the first microwave oscillator 310 to adjust the frequency of the output microwave to a predetermined frequency. At the same time, the control unit may control the first microwave amplifier 320 to adjust the phase and magnitude of the output microwave to a predetermined phase and magnitude.

When the microwave has been output (S253), the method detects the VSWR and isolation of the first semiconductor module at the predetermined frequency (S256).

In some implementations, the detection method is the same as the detection method as described above in operation S210 of FIG. 6. Detailed description thereof may be omitted.

When the VSWR and isolation of the first semiconductor module 300 have been detected (S256), the method analyzes whether the detected VSWR and isolation satisfy the predetermined reference VSWR and reference isolation respectively (S259).

In some implementations, this analysis method may be the same as the analysis method as described above in operation S215 of FIG. 6. Detailed description thereof may be omitted.

When the detected VSWR and isolation satisfy the predetermined reference VSWR and reference isolation respectively (S259), the control unit 500 stores the predetermined frequency as the optimal frequency (S263). Thereafter, the control unit may determine whether the predetermined frequency is the to-be scanned last frequency (S266).

Conversely, when the detected VSWR and isolation do not satisfy the predetermined reference VSWR and reference isolation (S259), the control unit 500 may immediately determine whether the predetermined frequency is the to-be scanned last frequency (S266).

Further, when the predetermined frequency is not the to-be scanned last frequency (S266), the method may return to the operation (S250).

However, when the predetermined frequency is the to-be-scanned last frequency, the control unit 500 terminates the scanning operation for the first semiconductor module 300. Then, the control unit may initiate a scanning operation for the second semiconductor module 400.

In this connection, the scanning operation on the second semiconductor module 400 may be performed on the same principle as the scanning operation on the first semiconductor module 300 as described above.

Conversely, when there is absent the microwave having a VSWR and an isolation satisfying the predetermined reference VSWR and reference isolation among the output microwaves, the control unit 500 may reset the scanning frequency step (S269).

Specifically, the control unit 500 may redefine the scanning frequency step based on the predetermined scanning condition. For example, when the to-be-scanned full frequency band is 2.4 GHz to 2.5 GHz, a 5 MHz unit may be reset as the scanning frequency step within 2.4 GHz to 2.5 GHz.

When the scanning frequency step has been reset (S269), the method controls the first semiconductor module 300 so that a frequency of the microwave output from the first semiconductor module 300 is changed by the reset scanning frequency step (S273).

Specifically, the control unit 500 may control the first semiconductor module 300 so that the frequency of the microwave output from the first semiconductor module 300 is changed by the predetermined scanning frequency step.

In this connection, while the control unit 500 controls the first semiconductor module 300 so that the frequency of microwaves output from the first semiconductor module 300 is changed by the reset scanning frequency step, the control unit 500 may control the first semiconductor module 300 to change a phase and magnitude of the microwave based on the predetermined scanning condition.

That is, the control unit 500 controls the first microwave oscillator 310 so that the frequency of the output microwave may be changed by the predetermined scanning frequency step. At the same time, the control unit 500 may control the first microwave amplifier 320 to adjust the phase and magnitude of the output microwave to a predetermined phase and magnitude respectively.

For example, when the reset scanning frequency step is 5 MHz, the frequency of the microwave as output from the first semiconductor module 300 may be varied by 5 MHz.

The varied frequency of the output microwave may be in a range of the to-be-scanned full frequency band.

When the first semiconductor module 300 is controlled to change the frequency of the microwave output from the first semiconductor module 300, the method may determine whether there is a microwave satisfying the predetermined reference VSWR and reference isolation among the output microwaves.

In this connection, the method may determine, using the operation S215 of FIG. 6, whether there is a microwave satisfying the predetermined reference VSWR and reference isolation among the output microwaves.

When there is the microwave satisfying the predetermined reference VSWR and reference isolation among the output microwaves (S276), the control unit 500 stores the frequency of the corresponding microwave (S279). The control unit 500 may then reset the scanning frequency step based on the stored frequency of the microwave (S283).

Operations S283 to S299 are identical with the operations S250 to S266, respectively, and, thus, detailed description thereof will be omitted.

When there is no microwave satisfying the predetermined reference VSWR and reference isolation among the output microwaves S276, the method returns to the operation S269.

As mentioned above, the microwave heating system 1 according to the present disclosure may control at least one of a frequency, a phase, or a magnitude of each of microwaves as generated from at least two semiconductor modules respectively. This may improve a heating algorithm. Furthermore. In a flat table system rather than a turntable system, improvement of the uniform-heating performance of the object may be achieved, which leads to aesthetic improvement.

Further, the microwave heating system 1 according to the present disclosure may improve the frequency scanning algorithm to determine the optimal frequency such that the object may be uniformly heated. This makes it possible to improve energy efficiency.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. A microwave heating system comprising:
    a power supply;
    a first semiconductor module configured to receive power from the power supply and to generate a first microwave;
    a second semiconductor module configured to receive power from the power supply and to generate a second microwave;
    a heating chamber that is configured to accommodate an object at an inside of the heating chamber and that allows transmission of the first microwave and the second microwave to the inside of the heating chamber; and
    a control unit configured to:
        control operation of each of the first semiconductor module and the second semiconductor module, and control at least one of a frequency, a phase, or a magnitude of each of the first microwave and the second microwave to increase a heating uniformity of the object, wherein the control unit is further configured to, in a concurrent-heating mode:
based on a predetermined scanning condition and a predetermined scanning mode, perform a first scanning operation with the first semiconductor module and a second scanning operation with the second semiconductor module,
based on results from the first scanning operation and the second scanning operation, determine a first optimal frequency for the first semiconductor module and a second optimal frequency for the second semiconductor module,
store the first optimal frequency for the first semiconductor module and the second optimal frequency for the second semiconductor module,
control the first semiconductor module to generate the first microwave at the first optimal frequency and the second semiconductor module to generate the second microwave at the second optimal frequency,
determine a magnitude of a cumulative microwave that is incident to the object from the first semiconductor module and the second semiconductor module,
compare the magnitude of the cumulative microwave to a reference microwave magnitude, and
based on comparison results, determine whether to stop operating the first semiconductor module and the second semiconductor module, and wherein the control unit is further configured to, in an alternate-heating mode:
perform a first scanning operation with the first semiconductor module,
based on a result of the first scanning operation, determine a first optimal frequency for the first semiconductor module,
store the first optimal frequency for the first semiconductor module,
operate the first semiconductor module to generate the first microwave at the stored first optimal frequency,
based on operation of the first semiconductor module at the stored first optimal frequency, perform a second scanning operation with the second semiconductor module,
based on a result of the second scanning operation, determine a second optimal frequency for the second semiconductor module,
store the second optimal frequency for the second semiconductor module, and
operate the second semiconductor module to generate the second microwave at the stored second optimal frequency.

2. The microwave heating system of claim 1, wherein the control unit is further configured to, in the concurrent-heating mode:
based on a determination that the magnitude of the cumulative microwave is greater than or equal to the reference microwave magnitude, stop operating the first semiconductor module and the second semiconductor module; and
based on a determination that the magnitude of the cumulative microwave is less than the reference microwave magnitude, perform the first scanning operation with the first semiconductor module and the second scanning operation with the second semiconductor module.

3. The microwave heating system of claim 1, wherein the predetermined scanning condition comprises a scan frequency band comprising one or more scan frequencies, and one or more condition sets each comprising a frequency, a phase, and a magnitude configured to be applied to the first microwave or the second microwave.

4. The microwave heating system of claim 1, wherein the control unit is further configured to, in the alternate-heating mode:
determine a magnitude of a cumulative microwave that is incident to the object from the first semiconductor module and the second semiconductor module;
based on a determination that the magnitude of the cumulative microwave is greater than or equal to a reference microwave magnitude, stop operating the first semiconductor module and the second semiconductor module; and
based on a determination that the magnitude of the cumulative microwave is less than the reference microwave magnitude, perform the first scanning operation with the first semiconductor module.

5. The microwave heating system of claim 1, wherein the first semiconductor module comprises:
a first microwave oscillator configured to receive power from the power supply to generate the first microwave;
a first microwave amplifier configured to amplify the magnitude of the first microwave generated from the first microwave oscillator;
a first output unit configured to output the first microwave amplified from the first microwave amplifier;
a first transmitter configured to direct the first microwave amplified from the first microwave amplifier to the first output unit; and
a first detector configured to sense at least one of a magnitude of a microwave that is incident from the first semiconductor module to the heating chamber or a magnitude of a microwave that is reflected from the heating chamber to the first semiconductor module;
wherein the second semiconductor module includes:
a second microwave oscillator configured to receive power from the power supply to generate the second microwave,
a second microwave amplifier configured to amplify the magnitude of the second microwave generated from the second microwave oscillator,
a second output unit configured to output the second microwave amplified from the second microwave amplifier,
a second transmitter configured to direct the second microwave amplified from the second microwave amplifier to the second output unit, and
a second detector configured to sense at least one of a magnitude of a microwave that is incident from the second semiconductor module to the heating chamber or a magnitude of a microwave that is reflected from the heating chamber to the second semiconductor module.

6. The microwave heating system of claim 5, wherein the control unit is further configured to:
control the first microwave oscillator to generate the first microwave at the frequency;
control the first microwave amplifier to adjust at least one of the magnitude or the phase of the first microwave;

receive, from the first detector, information about the magnitude of the first microwave; and detect a heated state of the object accommodated in the heating chamber.

7. The microwave heating system of claim 5, wherein the first microwave oscillator includes a radio frequency oscillator, wherein the first microwave amplifier includes a solid-state power amplifier (SSPA), wherein the first transmitter includes an isolator configured to transmit the first microwave in a direction, and wherein the first detector includes a directional coupler.

8. The microwave heating system of claim 1, wherein each of the first semiconductor module and the second semiconductor module comprises a solid-state power module (SSPM).

9. The microwave heating system of claim 1, further comprising:

a first antenna configured to transmit the first microwave generated from the first semiconductor module to the heating chamber; and a second antenna configured to transmit the second microwave generated from the second semiconductor module to the heating chamber.

10. The microwave heating system of claim 9, wherein at least one of the first antenna or the second antenna comprises a plurality of antennas.

11. A microwave heating system comprising:

a power supply;

a first semiconductor module configured to receive power from the power supply and to generate a first microwave;

a second semiconductor module configured to receive power from the power supply and to generate a second microwave;

a heating chamber that is configured to accommodate an object at an inside of the heating chamber and that allows transmission of the first microwave and the second microwave to the inside of the heating chamber; and a control unit configured to:

control operation of each of the first semiconductor module and the second semiconductor module, and control at least one of a frequency, a phase, or a magnitude of each of the first microwave and the second microwave to increase a heating uniformity of the object, wherein the control unit is further configured to, in a normal scanning mode:

control the first semiconductor module to output the first microwave at an output frequency defined in a predetermined scanning condition, based on output of the first microwave at the output frequency, determine a voltage standing wave ratio (VSWR) and an isolation value for the first semiconductor module, determine whether the determined VSWR satisfies a reference VSWR and whether the determined isolation value satisfies a reference isolation value, based on determination results regarding whether the determined VSWR satisfies the reference VSWR and whether the determined isolation value satisfies the reference isolation value, determine whether to store the output frequency, and after determining whether to store the output frequency, determine whether the output frequency corresponds to a last scan frequency defined in the predetermined scanning condition.

12. The microwave heating system of claim 11, wherein the control unit is further configured to:

based on determinations that the determined VSWR satisfies the reference VSWR and that the determined isolation value satisfies the reference isolation value:

store the output frequency as a first optimal frequency, and based on storing the output frequency as the first optimal frequency, determine whether the output frequency is the last scan frequency; and based on determinations that the determined VSWR does not satisfy the reference VSWR and that the determined isolation value does not satisfy the reference isolation value, determine whether the output frequency is the last scan frequency.

13. The microwave heating system of claim 12, wherein the control unit is further configured to:

based on a determination that the output frequency is not the last scan frequency, control the first semiconductor module to output the first microwave at a frequency that is greater than the output frequency and that is defined in the predetermined scanning condition; and based on a determination that the output frequency is the last scan frequency:

terminate a first scanning operation with the first semiconductor module, and initiate a second scanning operation with the second semiconductor module.

14. The microwave heating system of claim 11, wherein the VSWR for the first semiconductor module comprises a ratio parameter between a magnitude of the first microwave that is output from the first semiconductor module and a magnitude of a microwave that is reflected from the heating chamber to the first semiconductor module, and wherein the isolation value for the first semiconductor module comprises a ratio parameter between a magnitude of the first microwave that is output from the first semiconductor module and a magnitude of a microwave that is reflected from the heating chamber to the second semiconductor module.

15. The microwave heating system of claim 11, wherein the control unit is further configured to:

control the first semiconductor module to output the first microwave at the output frequency defined in the predetermined scanning condition; and control the phase and the magnitude of the first microwave defined in the predetermined scanning condition.

16. The microwave heating system of claim 11, wherein the first semiconductor module and the second semiconductor module are configured to operate in a concurrent-heating mode, and wherein the control unit is further configured to, in the concurrent-heating mode:

based on the predetermined scanning condition and a predetermined scanning mode, perform a first scanning operation with the first semiconductor module and a second scanning operation with the second semiconductor module;

based on results from the first scanning operation and the second scanning operation, determine a first optimal frequency for the first semiconductor module and a second optimal frequency for the second semiconductor module;

store the first optimal frequency for the first semiconductor module and the second optimal frequency for the second semiconductor module;

control the first semiconductor module to generate the first microwave at the first optimal frequency and the second semiconductor module to generate the second microwave at the second optimal frequency;

determine a magnitude of a cumulative microwave that is incident to the object from the first semiconductor module and the second semiconductor module;

compare the magnitude of the cumulative microwave to a reference microwave magnitude; and based on comparison results, determine whether to stop operating the first semiconductor module and the second semiconductor module.

17. A microwave heating system comprising:
a power supply;
a first semiconductor module configured to receive power from the power supply and to generate a first microwave;
a second semiconductor module configured to receive power from the power supply and to generate a second microwave;
a heating chamber that is configured to accommodate an object at an inside of the heating chamber and that allows transmission of the first microwave and the second microwave to the inside of the heating chamber; and
a control unit configured to:
control operation of each of the first semiconductor module and the second semiconductor module, and
control at least one of a frequency, a phase, or a magnitude of each of the first microwave and the second microwave to increase a heating uniformity of the object,
wherein the control unit is further configured to, in a fast scanning mode:
set a scanning frequency interval defined in a predetermined scanning condition,
control the first semiconductor module to output a first plurality of microwaves by changing the frequency of the first microwave based on the scanning frequency interval,
determine a voltage standing wave ratio (VSWR) and an isolation value for each of the first plurality of microwaves, and
determine whether a microwave among the first plurality of microwaves has the VSWR satisfying a reference VSWR and the isolation value satisfying a reference isolation value.

18. The microwave heating system of claim 17, wherein the control unit is further configured to, based on a determination that the microwave among the first plurality of microwaves has the VSWR satisfying the reference VSWR and the isolation value satisfying the reference isolation value:
store a frequency of the microwave among the first plurality of microwaves;
reset the scanning frequency interval based on the stored frequency of the microwave among the first plurality of microwaves;
based on the scanning frequency interval that has been reset based on the stored frequency of the microwave, control the first semiconductor module to output a microwave at an output frequency defined in the predetermined scanning condition;
based on output of the microwave at the output frequency, determine a VSWR and an isolation value for the first semiconductor module at the output frequency;
determine whether the determined VSWR satisfies the reference VSWR and whether the determined isolation value satisfies the reference isolation value;
based on determination results regarding whether the determined VSWR satisfies the reference VSWR and whether the determined isolation value satisfies the reference isolation value, determine whether to store the output frequency; and
after determining whether to store the output frequency, determine whether the output frequency corresponds to a last scan frequency defined in the predetermined scanning condition.

19. The microwave heating system of claim 17, wherein the control unit is further configured to, based on a determination that no microwave among the first plurality of microwaves has the VSWR satisfying the reference VSWR and the isolation value satisfying the reference isolation value:
reset the scanning frequency interval;
control the first semiconductor module to output a second plurality of microwaves by changing the frequency of the first microwave based on the scanning frequency interval that has been reset based on the stored frequency of the microwave;
determine a VSWR and an isolation value for each of the second plurality of microwaves; and
determine whether a microwave among the second plurality of microwaves output from the first semiconductor module has the VSWR satisfying the reference VSWR and the isolation value satisfying the reference isolation value.

20. The microwave heating system of claim 17, wherein the first semiconductor module and the second semiconductor module are configured to operate in a concurrent-heating mode, and
wherein the control unit is further configured to, in the concurrent-heating mode:
based on the predetermined scanning condition and a predetermined scanning mode, perform a first scanning operation with the first semiconductor module and a second scanning operation with the second semiconductor module;
based on results from the first scanning operation and the second scanning operation, determine a first optimal frequency for the first semiconductor module and a second optimal frequency for the second semiconductor module;
store the first optimal frequency for the first semiconductor module and the second optimal frequency for the second semiconductor module;
control the first semiconductor module to generate the first microwave at the first optimal frequency and the second semiconductor module to generate the second microwave at the second optimal frequency;
determine a magnitude of a cumulative microwave that is incident to the object from the first semiconductor module and the second semiconductor module;
compare the magnitude of the cumulative microwave to a reference microwave magnitude; and
based on comparison results, determine whether to stop operating the first semiconductor module and the second semiconductor module.

* * * * *